(12) United States Patent
Jang et al.

(10) Patent No.: US 6,504,497 B2
(45) Date of Patent: Jan. 7, 2003

(54) HOLD-UP-TIME EXTENSION CIRCUITS

(75) Inventors: Yungtaek Jang, Apex, NC (US); Milan M. Jovanovic, Cary, NC (US)

(73) Assignee: Delta Electronics, Inc., Taiwan (CN)

( * ) Notice: Subject to any disclaimer, the term of this patent is extended or adjusted under 35 U.S.C. 154(b) by 0 days.

(21) Appl. No.: 09/855,715

(22) Filed: May 16, 2001

(65) Prior Publication Data

US 2002/0071300 A1 Jun. 13, 2002

Related U.S. Application Data

(60) Provisional application No. 60/243,614, filed on Oct. 30, 2000.

(51) Int. Cl.$^7$ ................................................ H03M 1/00
(52) U.S. Cl. .......................... 341/125; 363/21; 363/39; 363/89
(58) Field of Search ............................ 341/125; 363/61, 363/39, 21, 89, 8; 323/271, 222

(56) References Cited

U.S. PATENT DOCUMENTS

| | | | | |
|---|---|---|---|---|
| 5,621,631 A | * | 4/1997 | Vinciarelli et al. | ............ 363/89 |
| 5,959,438 A | * | 9/1999 | Jovanovic et al. | ............ 323/222 |
| 6,057,652 A | * | 5/2000 | Chen et al. | .................. 315/307 |
| 6,069,801 A | * | 5/2000 | Hodge, Jr. et al. | ............. 363/21 |
| 6,147,882 A | * | 11/2000 | Huber et al. | .................... 363/39 |
| 6,343,021 B1 | * | 1/2002 | Williamson | ...................... 363/8 |
| 2002/0000795 A1 | * | 1/2002 | Wittenbreder | ................ 323/271 |

* cited by examiner

*Primary Examiner*—Brian Young
*Assistant Examiner*—John Nguyen
(74) *Attorney, Agent, or Firm*—Venable; Robert S. Babayi

(57) ABSTRACT

The stored energy in the energy-storage capacitors of a power supply during the hold-up time is improved by providing two groups of energy storage capacitors, and by connecting one group of capacitors to the input of a hold-up-time extension circuit that has its output connected to the other group of energy-storage capacitors. Each group of energy-storage capacitors may consist of a single capacitor, or a number of capacitors connected in parallel. The hold-up-time extension circuit is designed so that its output is regulated at a voltage that is lower than the minimum regulation voltage of the output-stage dc/dc converter. As a result, the hold-up-time extension circuit is inactive during the normal operation mode. i.e., when the input voltage is present. In fact, during the normal operation mode both groups of capacitors are effectively connected in parallel so that their voltages are equal.

17 Claims, 14 Drawing Sheets

HOLD-UP-TIME EXTENSION CIRCUITS

CROSS REFERENCE TO RELATED APPLICATIONS

This application claims the benefit of provisional patent application No. 60/243,614 filed Oct. 30, 2000.

BACKGROUND OF THE INVENTION

1. Field of the Invention

This invention relates to power converters that need to provide regulated output(s) for some time after an input-voltage drop out.

2. Description of the Prior Art

The majority of today's computer and computer peripherals require power supplies that are capable of operating in the 90–270-Vac range and can provide a hold-up time of at least 10 ms. Generally, the hold-up time is the time during which a power supply needs to maintain its output voltage(s) within the specified range after a drop-out of the line voltage. This time is used to orderly terminate the operation of a data-processing equipment or to switch over to the UPS operation after a line failure. The required energy to support the output during the hold-up time is obtained from a properly sized energy-storage capacitor CB, shown in FIG. 1(a). Generally, the front-end rectifier can be either a simple full-wave diode rectifier, or a rectifier with an active power-factor-correction (PFC) circuit.

To achieve a desired hold-up time, the dc/dc converter output stage in FIG. 1(a) must be designed to operate in a certain voltage range with minimum energy-storage-capacitor voltage $V_{BMIN}$ lower than voltage $V_{BH}$ that corresponds to the line voltage at which hold-up time is defined. With such a design of the dc/dc output stage, the energy storage capacitor delivers power to the output after a line dropout until the energy-storage-capacitor discharges to $V_{BMIN}$, as illustrated in FIG. 1(b).

The relationship between the value of energy-storage capacitor $C_B$ and hold-up time $T_H$ is given by $$C_B = \frac{2 \cdot \frac{P_{OH}}{\eta_{DC/DC}} \cdot T_H}{V_{BH}^2 - V_{BMIN}^2}, \quad (1)$$

where $P_{OH}$ is the output power that needs to be provided during hold-up time $T_H$ and $\eta_{DC/DC}$ is the efficiency of the dc/dc converter output stage.

As can be seen from Eq. (1), for a given $V_{BH}$ and $V_{BMIN}$, larger power $P_{OH}$ and/or longer hold-up time $T_H$ requires a larger energy-storage capacitor $C_B$. As a result, in high-power application, the size of energy-storage capacitor(s) very often limits the maximum power density. Therefore, to maximize power density the size of energy-storage capacitors must be minimized. A limited size reduction of energy-storage capacitor $C_B$ in FIG. 1 can be achieved by extending the regulation range of the dc/dc converter output stage by minimizing voltage $V_{BMIN}$ at which the dc/dc converter output stage drops out of regulation. However, because of a strong trade-off between minimum regulation voltage $V_{BMIN}$ and the conversion efficiency of the dc/dc converter, $V_{BMIN}$ is usually restricted to 80% to 90 % of $V_{BH}$. With such a selection of $V_{BMIN}$, only a small part of the energy stored in $C_B$ is delivered during the hold-up period. The fraction of the delivered energy can be calculated from $$\frac{\Delta E_{CB}}{E_{CBH}} = 1 - \left(\frac{V_{BMIN}}{V_{BH}}\right)^2, \quad (2)$$

where $\Delta E_{CB}$ is the amount of the delivered energy to the output during hold-up time and $E_{CBH}$ is the total stored energy in $C_B$ at $V_{CBH}$.

Equation (2) is shown in a graphical form in FIG. 2. As seen from FIG. 2, only 19% of stored energy is delivered to the load during the hold-up time if $V_{BMIN}$ is selected to be $0.9V_{BH}$. Similarly, if $V_{BMIN}$ is selected to be $0.8V_{BH}$, 36% of the stored energy is delivered to the output, i.e., still the majority of the stored energy is not used to supple the load during the hold-up time.

To utilize the majority of the stored energy during the hold-up time, $V_{BMIN}$ must be selected well below 80% of $V_{BH}$. For example, 75% of the stored energy is delivered to the load for $V_{BMIN}=0.5V_{BH}$. However, with $V_{BMIN}=0.5V_{BH}$, the efficiency of the dc/dc converter and, therefore, the overall efficiency would be severally penalized because the dc/dc converter output stage would be required to operate with a wider input voltage range. Namely, to regulate the output in a wider input-voltage range, a wider duty-cycle range is needed, which requires that the transformer in the dc/dc converters has a smaller turns ratio. Generally, a smaller turns ratio increases the primary and, very often, secondary conduction losses, which deteriorates the conversion efficiency.

In this invention a method that substantially improves the utilization of the energy stored in the energy-storage capacitor without deterioration of the conversion efficiency is described.

SUMMARY OF THE INVENTION

In this invention, a method that substantially improves the utilization of the stored energy in the energy-storage capacitors of a power supply during the hold-up time is described. The improvement is achieved by providing two groups of energy storage capacitors, and by connecting one group of capacitors to the input of a hold-up-time extension circuit that has its output connected to the other group of energy-storage capacitors. (Each group of energy-storage capacitors may consist of a single capacitor, or a number of capacitors connected in parallel.)

The hold-up-time extension circuit is designed so that its output is regulated at voltage that is lower than the minimum regulation voltage of the output-stage dc/dc converter. As a result, the hold-up-time extension circuit is inactive during the normal operation mode. i.e., when the input voltage is present. In fact, during the normal operation mode both groups of capacitors are effectively connected in parallel so that their voltages are equal.

The hold-up-time extension circuit becomes activated after a line-voltage dropout when the voltage across the capacitors discharges to a voltage close to the minimum regulation voltage of output-stage dc/dc converter. Once the hold-up-time extension circuit is activated, the capacitors connected to the input of the hold-up-time extension circuit continues to discharge and provide energy to the regulated output of the hold-up-time extension circuit, which keeps the voltage across the capacitors connected at the output of the hold-up-time extension circuit constant at the voltage slightly above the minimum regulation voltage of the dc/dc converter output stage. Therefore, during this phase of operation, energy stored in the capacitors at the input of the hold-up-time extension circuit is used to deliver the required output power during the hold-up time. The hold-up time is terminated when the voltage of the capacitors at the input of the hold-up-time extension circuit reaches the minimum regulation voltage of the hold-up-time extension circuit.

The hold-up-time extension circuit can be implemented with any boost-like topology, i.e., with any non-isolated or isolated topology that can operate with its output voltage greater than the input voltage. For example, the boost, sepic, and flyback topologies are good candidates for implementing the hold-up-time extension circuit.

In power supplies with a front end implemented with an active power-factor correction circuit, the power-factor-correction circuit itself can be used during hold-up time to perform the function of the hold-up-time extension circuit. This implementation minimizes the number of power-stage and control components necessary to implement the hold-up time circuit, but requires more sophisticated detection and logic circuitry to properly implement hold-up-time extension function.

Finally, it should be noted that the method of this invention could be applied to not only to ac/dc, but also to dc/dc, dc/ac, and ac/ac power converters that require hold-up time capability.

DETAILED DESCRIPTION OF THE INVENTION

Figure 3:
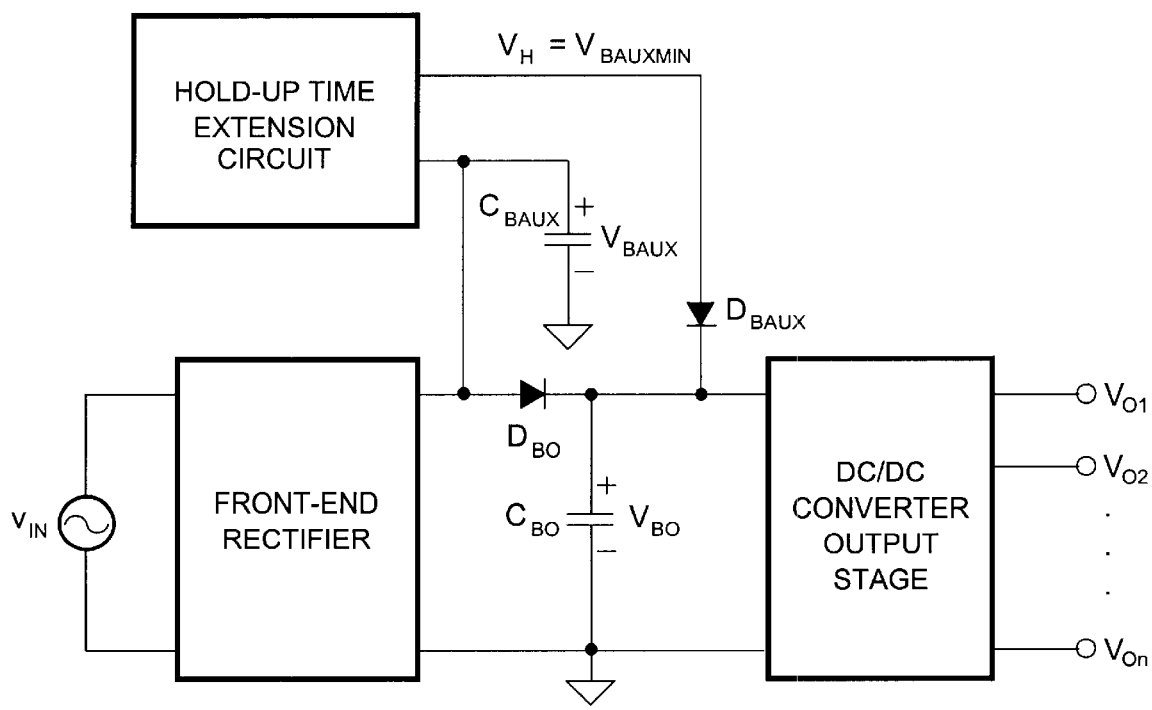
FIG. 3 shows the conceptual implementation of the hold-up-time extension circuit: (a) block diagram; (b) energy-storage-capacitor voltage $V_{BO}$ and auxiliary energy-storage-capacitor voltage $V_{BAUX}$ waveforms.
Figure 3:
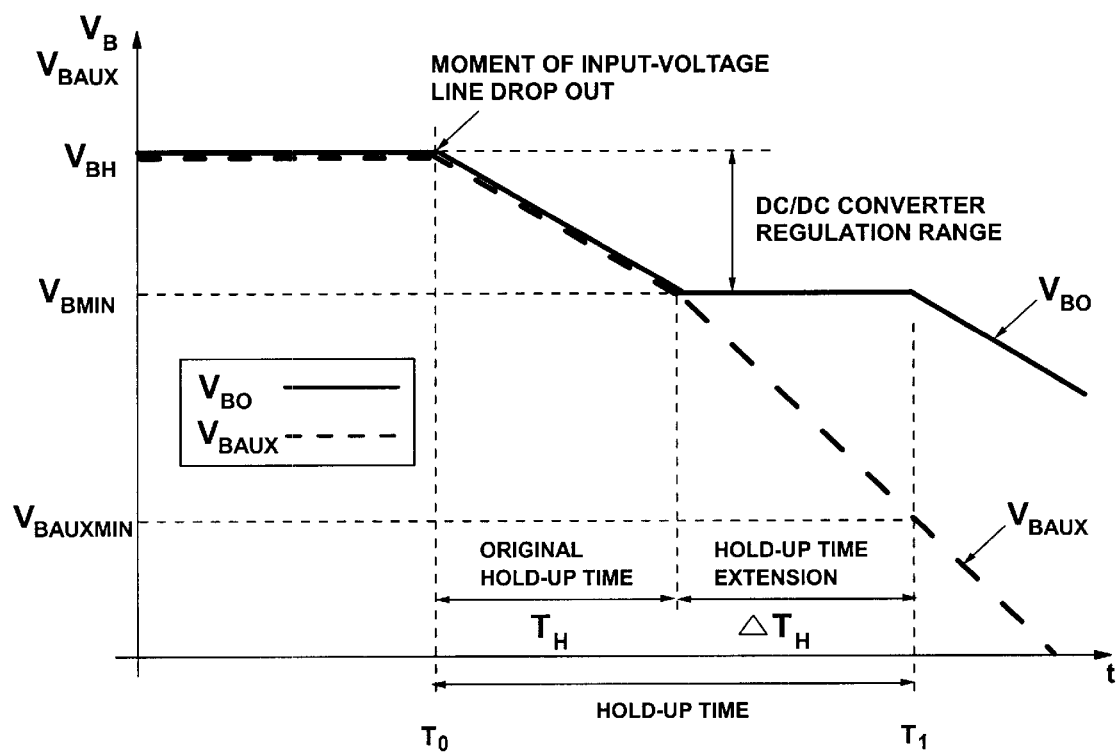

The conceptual block diagram of the invention is shown in FIG. 3(a). Generally, the improved utilization of the stored hold-up energy is obtained by providing two energy storage capacitors, $C_{BO}$ and $C_{BAUX}$, and by connecting auxiliary energy-storage capacitor $C_{BAUX}$ to the input of the hold-up-time extension circuit that has the output connected to the energy-storage capacitor $C_{BO}$. Each of the capacitors ($C_{BO}$ and $C_{BAUX}$) may consist of a single capacitor, or a number of capacitors connected in parallel. To ensure a proper operation, diodes $D_{BO}$ and $D_{BAUX}$ are connected in the circuit as shown in FIG. 3(a) to provide necessary decoupling of certain parts of the circuits during different phases of operation. It should be noted that depending on the actual implementation of the front-end rectifier circuit, as well as the hold-up time circuit, diode $D_{BAUX}$ may not be required.

The hold-up-time extension circuit is designed so that its output is regulated at voltage $V_{BAUX}$, which is lower than the normal-mode-operation voltage $V_{BH}$ and slightly higher than the minimum regulation voltage of the dc/dc converter $V_{BMIN}$. As a result, the hold-up-time extension circuit is inactive during the normal operation mode i.e., when the ac line is present at the input of the power supply. In fact, during the normal operation mode, capacitors $C_{BO}$ and $C_{BAUX}$ are connected in parallel so that their voltages are equal if the voltage drop across rectifier $D_{BO}$ is neglected.

Figure 1:
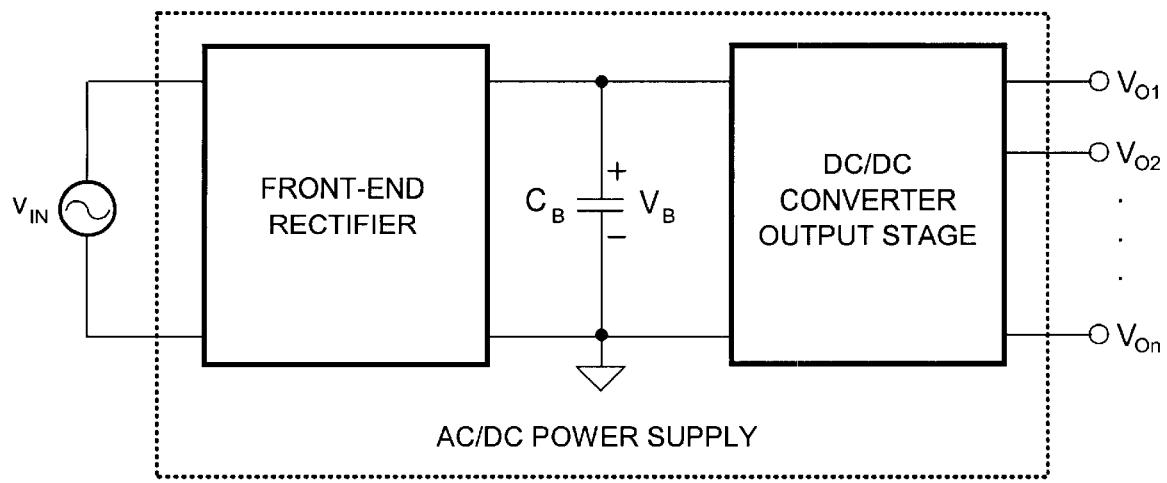
FIG. 1 shows a typical ac/dc power supply: (a) block diagram; (b) energy-storage-capacitor voltage waveform. (prior art).
Figure 1:
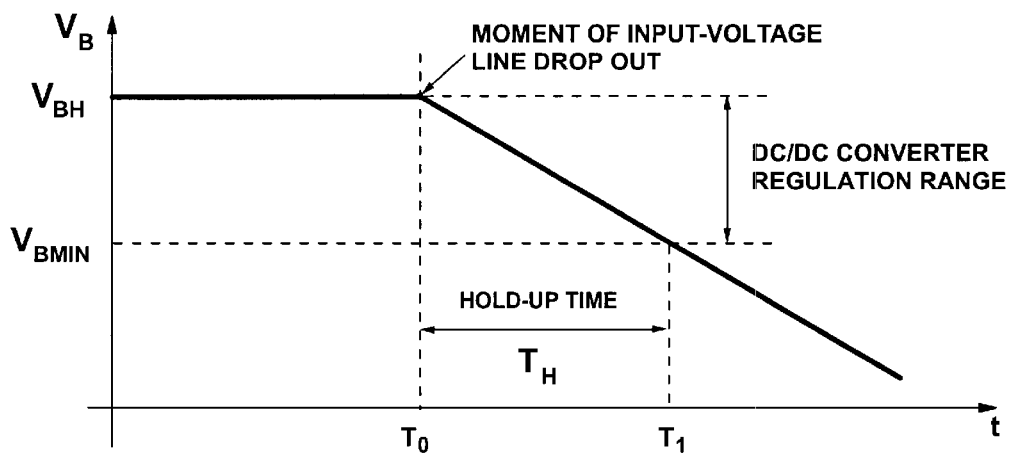
Figure 2:
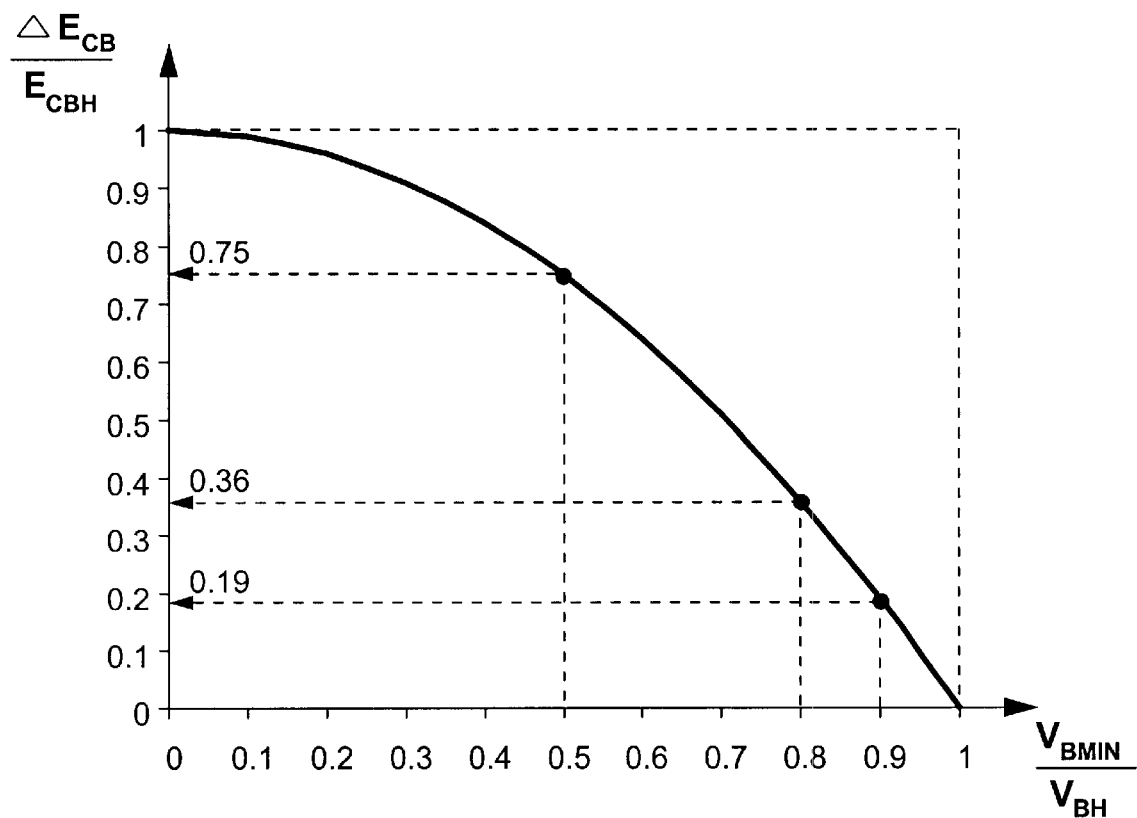
FIG. 2 shows the plot of normalized delivered energy from the energy-storage capacitor during hold-up time $\Delta E_{CB}/E_{CBH}$ as a function of normalized minimum energy-storage-capacitor voltage $V_{BMIN}/V_{BH}$ for the circuit in FIG. 1 (prior art).

When the ac line drops out the output power is first supplied from the energy stored in capacitors $C_{BO}$ and $C_{BAUX}$. As a result, the capacitors start discharging and their voltages starts decreasing, as shown in FIG. 3(b). During this phase of operation, voltage $V_{BO}$ across capacitor $C_{BO}$ and voltage $V_{BAUX}$ across capacitor CAUX track each other since the capacitors are simultaneously discharging. In fact, the operation of the circuit during this phase is identical to that of the circuit in FIG. 1.

When the voltage across the capacitors reaches a level close to the minimum regulation voltage of dc/dc converter $V_{BMIN}$, i.e., when $V_{BO=VBAUX} \approx V_{BMIN}$, the hold-up-time extension circuit becomes activated. Once the hold-up-time extension circuit is activated, the capacitor $C_{BAUX}$ connected to the input of the hold-up-time extension circuit continues to discharge and provide energy to the regulated output of the hold-up-time extension circuit, which keeps the voltage across capacitor $C_{BO}$ constant at approximately $V_{BMIN}$, as shown in FIG. 3(b). Therefore, during this phase of operation, energy stored in capacitor $C_{BAUX}$ is used to delivered the required output power during the hold-up time. The hold-up time of the circuit in FIG. 3(a) is terminated when the voltage across $C_{BAUX}$ decreases to $V_{BAUXMIN}$, which is the minimum regulation voltage of the hold-up-time extension circuit.

As can be seen from FIG. 3(b), the extension of the hold-up time brought about by the hold-up-time extension circuit is dependent on the selection of $V_{BAUXMIN}$. A lower $V_{BAUXMIN}$ results in a longer extension of the hold-up time because more energy is taken from capacitor $C_{BAUX}$. For a given $V_{BAUXMIN}$, the extension of the hold-up time depends on the size of $C_{BAUX}$ and it increases as the capacitance of $C_{BAUX}$ is increased.

The fraction of energy delivered to the output during the hold-up time with the hold-up-time extension circuit is given by $$\frac{\Delta E_{CBEC}}{E_{CBH}} = \qquad (3)$$

$$1 - \left(\frac{V_{BMIN}}{V_{BH}}\right)^2 + \left(\frac{C_{BAUX}}{C_{BO} + C_{BAUX}}\right) \cdot \left(\frac{V_{BMIN}}{V_{BH}}\right)^2 \cdot \left[1 - \left(\frac{V_{BAUXMIN}}{V_{BMIN}}\right)^2\right],$$

where the first term on the right-hand side of Eq. (3) represents the delivered energy without the hold-up-time extension circuit given by Eq. (2) and the second term represents the additional delivered energy because of the hold-up-time extension circuit.

Figure 4A:
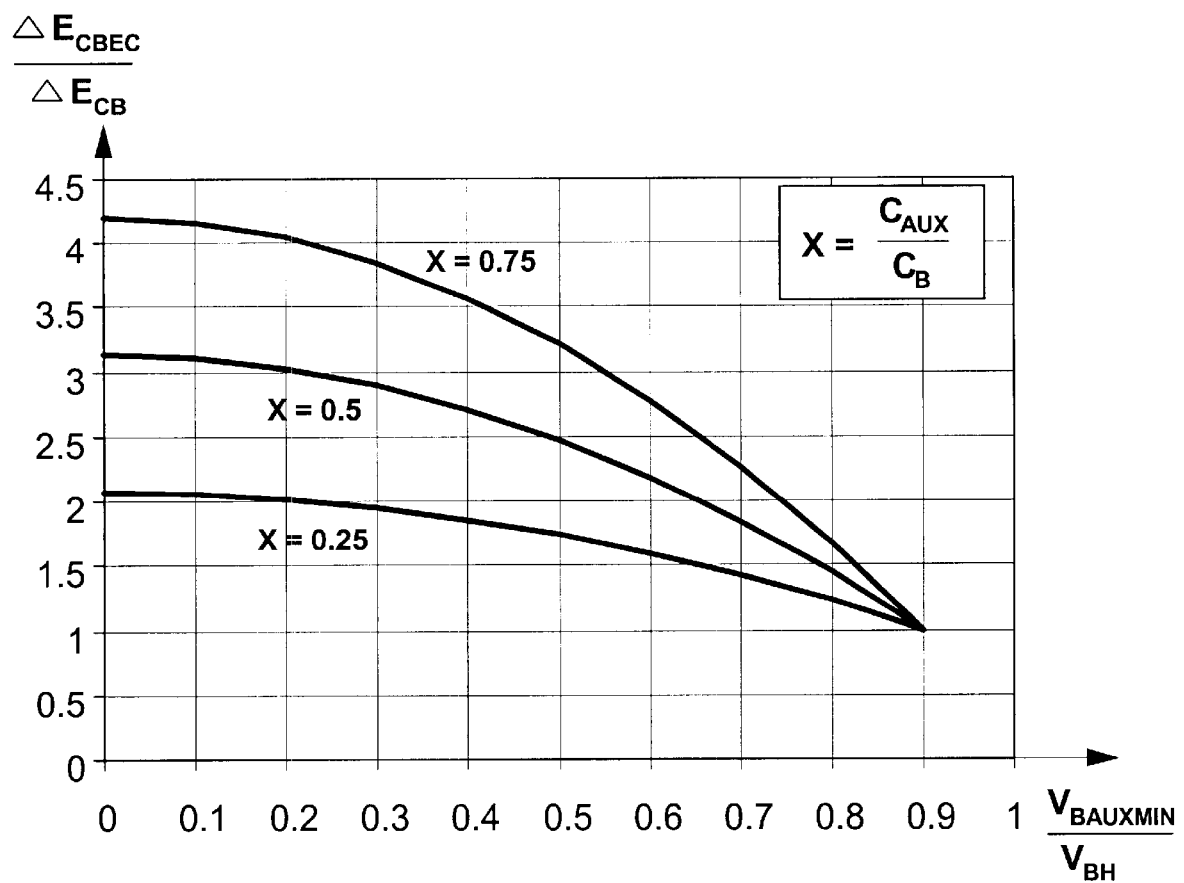
FIG. 4 shows the plots of the ratio of the additional discharged energy due to the hold-up-time extension circuit $\Delta E_{CBEC}$ and the discharged energy without the hold-up extension circuit $\Delta E_{CB}$ as functions of $V_{BAUXMIN}/V_{BH}$ for different $C_{AUX}/C_B$ ratios: (a) $V_{BMIN}/V_{BH}=0.9$; (b) $V_{BMIN}/V_{BH}=0.8$.
Figure 4B:
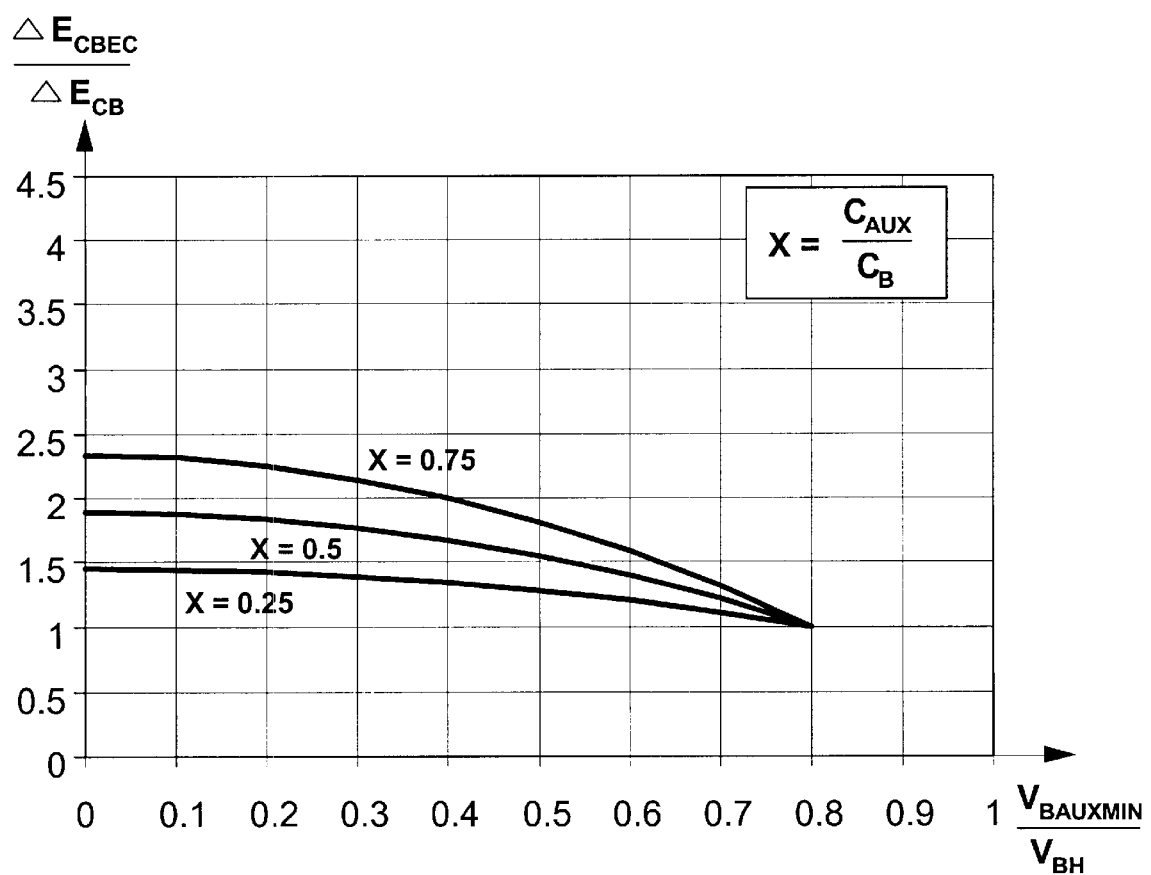

To evaluate the effectiveness of the proposed hold-up-time extension method, FIG. 4 shows plots of the ratio of the additional discharge energy (second term in Eq. (3)) due to the hold-up-time extension circuit $\Delta E_{EC}$ and the energy discharge without the hold-up extension circuit $\Delta E_{CB}$ (first term in Eq. (3)) as functions of $V_{BAUXMIN}/V_{BH}$ for different $C_{BAUX}/(C_{BO}+C_{BAUX})$ ratios. FIG. 4(a) presents plots for $V_{BMIN}/V_{BH}=0.9$, whereas FIG. 4(b) shows plots for $V_{BMIN}/V_{BH}=0.8$, i.e., for two regulation ranges of the dc/dc converter output stage in FIG. 3(a). The plots in FIGS. 4(a) and (b) are generated by assuming that $C_{BO}+C_{BAUX}=C_B$, i.e., that total energy storage capacitance in the implementations with and without the hold-up time circuit is the same. Therefore, different ratios of $C_{BAUX}/C_B$ used as the parameter in the plots in FIGS. 4(a) and (b) mean different allocations of the total capacitance $C_B$ among auxiliary capacitance $C_{BAUX}$ and capacitance $C_{BO}$.

As can be seen from FIG. 4(a), for a given ratio $V_{BAUXMIN}/V_{BH}$ the amount of extracted energy from the energy-storage capacitors is increased as the ratio $X=C_{BAUX}/C_B$ increases, i.e., as more of the total capacitance is allocated to $C_{BAUX}$. For example, for $V_{BAUXMIN}/V_{BH}=0.5$ and X=0.25, the hold-up-time extension circuit helps extract 73.6% more energy from the energy-store capacitors compared with the implementation without the hold-up-time extension circuit that has the same amount of the energy-storage capacitance. For larger values of ratio $X=C_{AUX}/C_B$ the effect of the hold-up-time extension circuit is even more dramatic since it increases the amount of the delivered energy from the storage capacitors by 147.3% for X=0.5 and 202.9% for X=0.75.

The effectiveness of the hold-up-time extension circuit is also dependent on the regulation range of the dc/dc converter in FIG. 3(a), i.e. it is dependent on the $V_{BMIN}/V_{BH}$ ratio. As can be seen from FIG. 4(b), for $V_{BMIN}/V_{BH}=0.8$ and $V_{BAUXMIN}/V_{BH}=0.5$, the hold-up-time extension circuit helps extract 27%, 54.1%, and 81.2% more energy for X=0.25, X=0.5, and X=0.75, respectively.

The improved utilization of the stored energy of the energy-storage capacitors makes possible to optimize the circuit performance by meeting the hold-up time requirement with the minimal energy-storage capacitance.

Generally, for the maximum effectiveness of the hold-up time circuit, it is necessary to maximize auxiliary capacitance $C_{BAUX}$ since the energy stored in this $C_{BAUX}$ is delivered to the output when the hold-up-time extension circuit is activated. The energy stored in capacitor $C_{BO}$ is only delivered during the hold-up time period before the hold-up-time extension circuit is activated at approximately $V_{BMIN}$. Therefore, the design optimization of the hold-up-time extension circuit requires that the available total energy-storage capacitance be allocated between $C_{BO}$ and $C_{BAUX}$ so that $C_{BAUX}$ is maximized. In practice, this allocation is usually dictated by the minimum capacitance $C_{BO}$ that can handle the voltage and current ripple produced at the output of the hold-up-time extension circuit.

Since when the hold-up-time extension circuit is activated the voltage across $C_{BAUX}$ is lower than the voltage across $C_{BO}$, as shown in FIG. 3(b), the hold-up-time extension circuit can be implemented with any boost-like non-isolated or isolated topology. (Boost-like topologies are those, which can operate with the input voltage, lower than the output voltage.)

Figure 5:
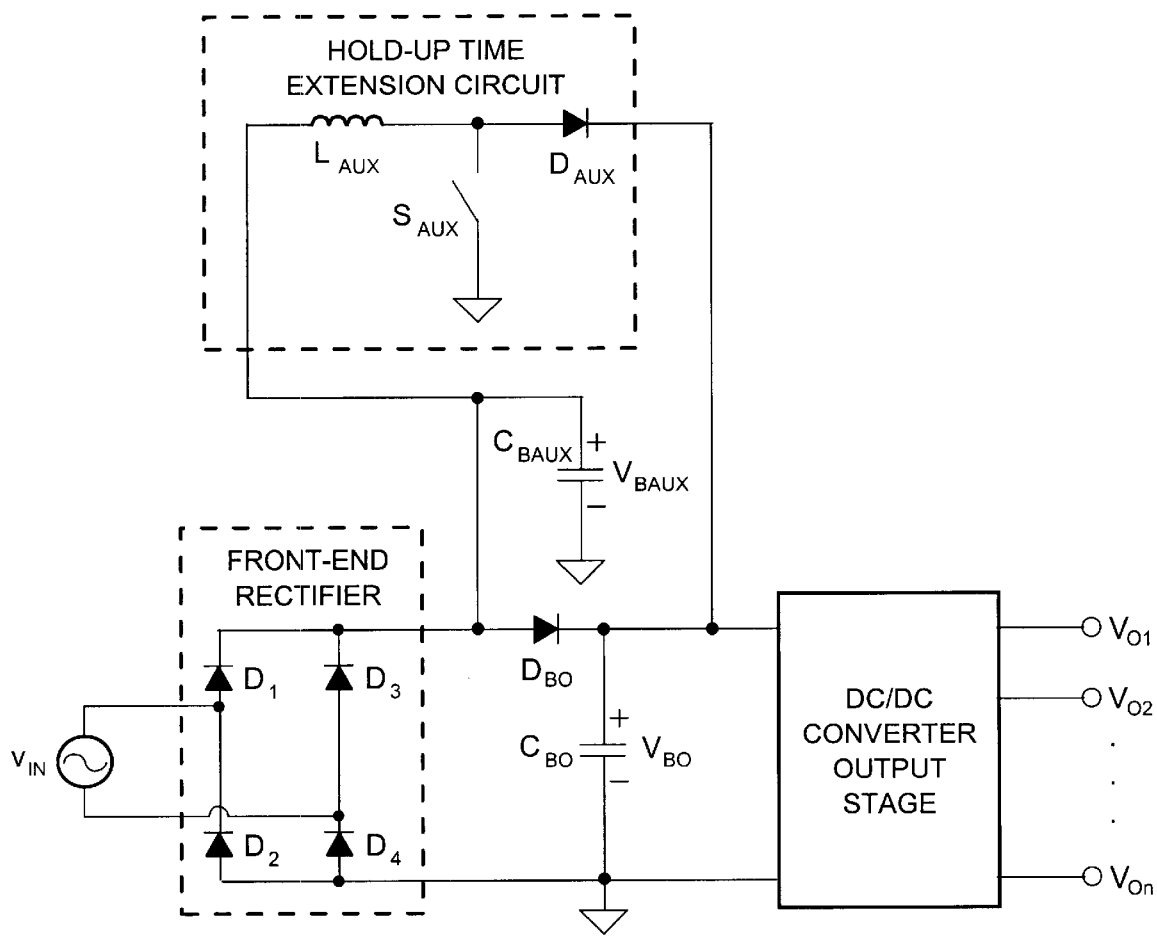
FIG. 5 shows the implementation of the hold-up-time extension circuit with the boost topology for a power supply with the full-wave-rectifier front end.

FIG. 5 shows the implementation of the hold-up-time extension circuit with the boost topology in a power supply without the full-bridge-rectifier front end, whereas FIG. show the implementation with a boost front end. As can be seen from FIG. 6, the roll of rectifier $D_{BAUX}$ in FIG. 3(a) is taken by the boost diode of the hold-up extension circuit. In addition, rectifiers $D_5$ and $D_6$ are used to properly interface the boost front-end with the boost hold-up-time extension circuit.

Figure 7:
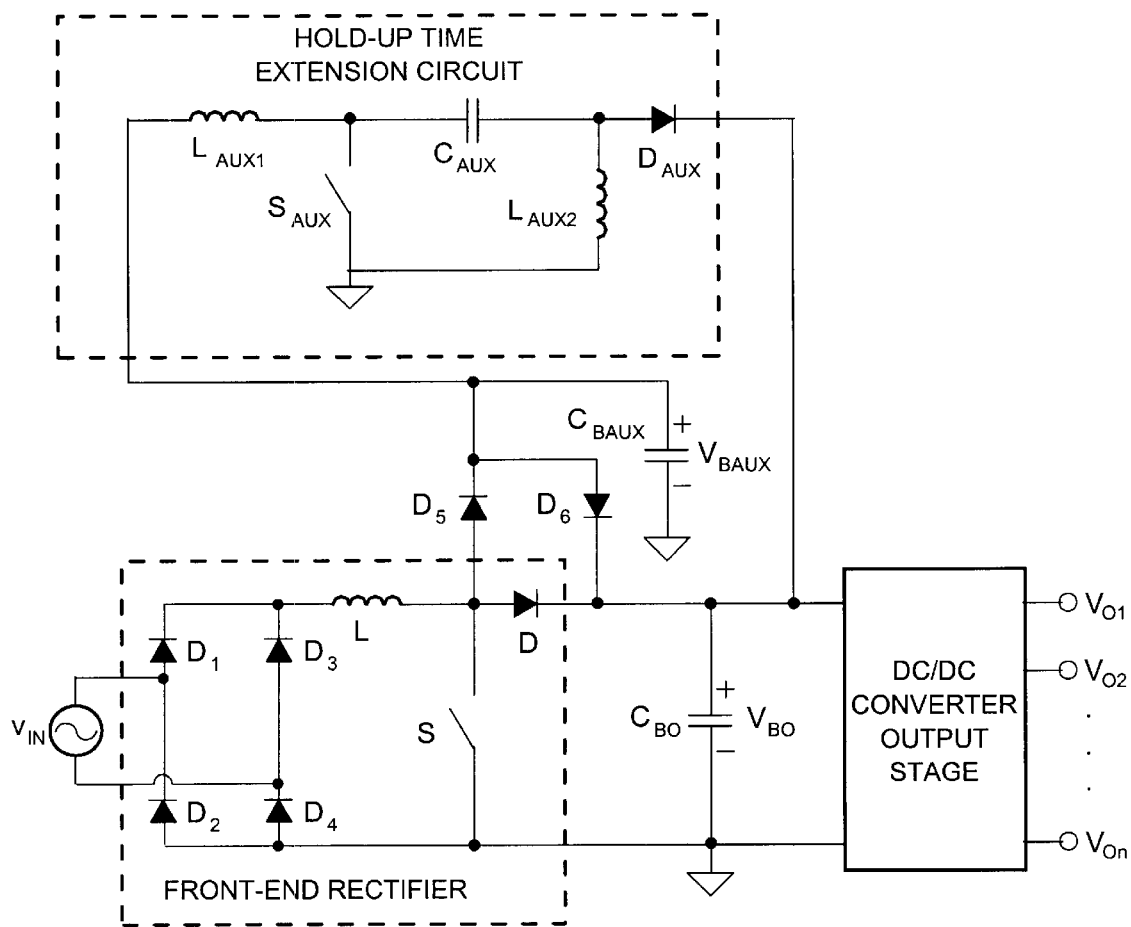
FIG. 7 shows the implementation of the hold-up-time extension circuit with the sepic topology for a power supply with a boost front end.
Figure 8:
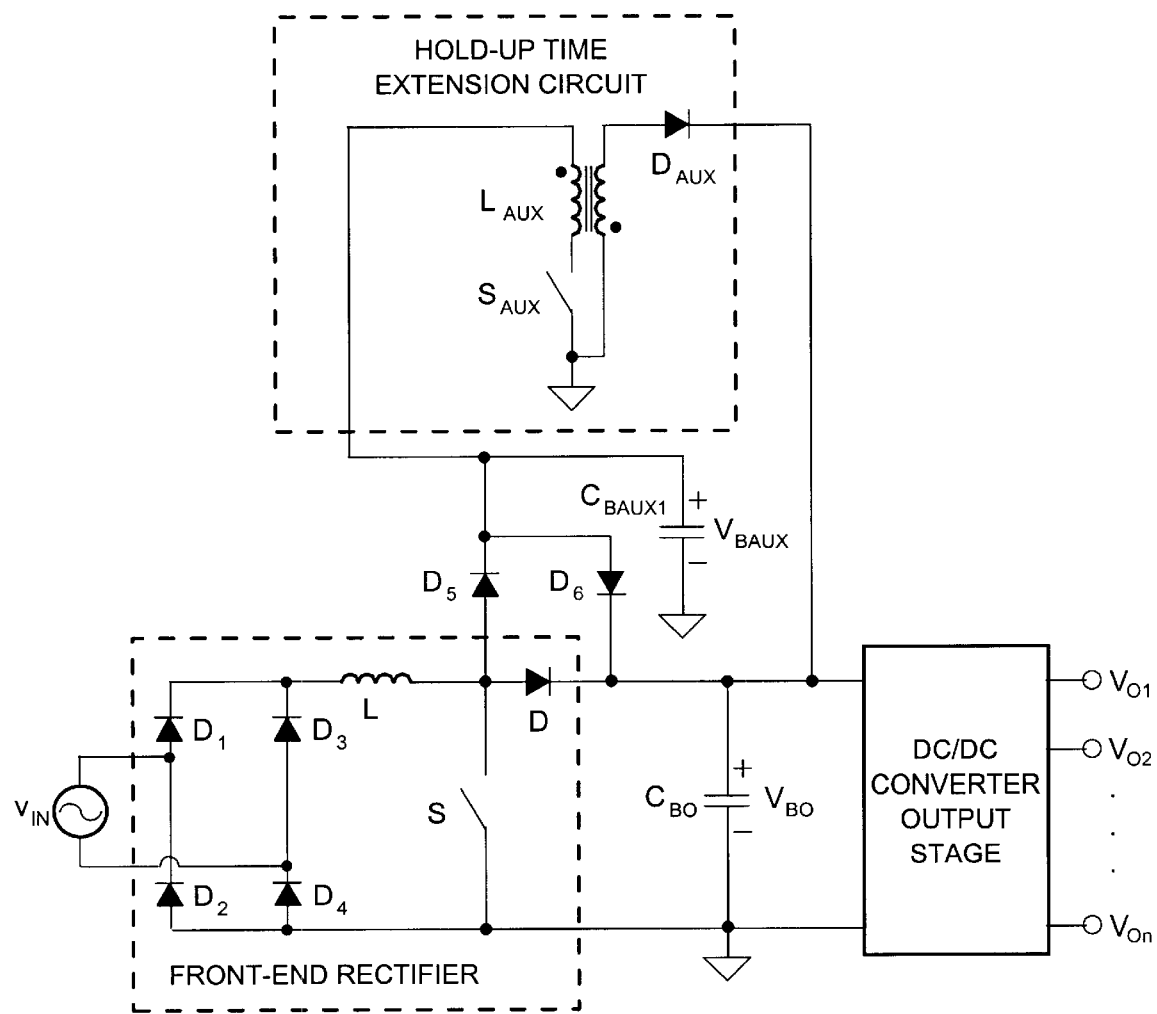
FIG. 8 shows the implementation of the hold-up-time extension circuit with the flyback topology for a power supply with a boost front end.
Figure 9:
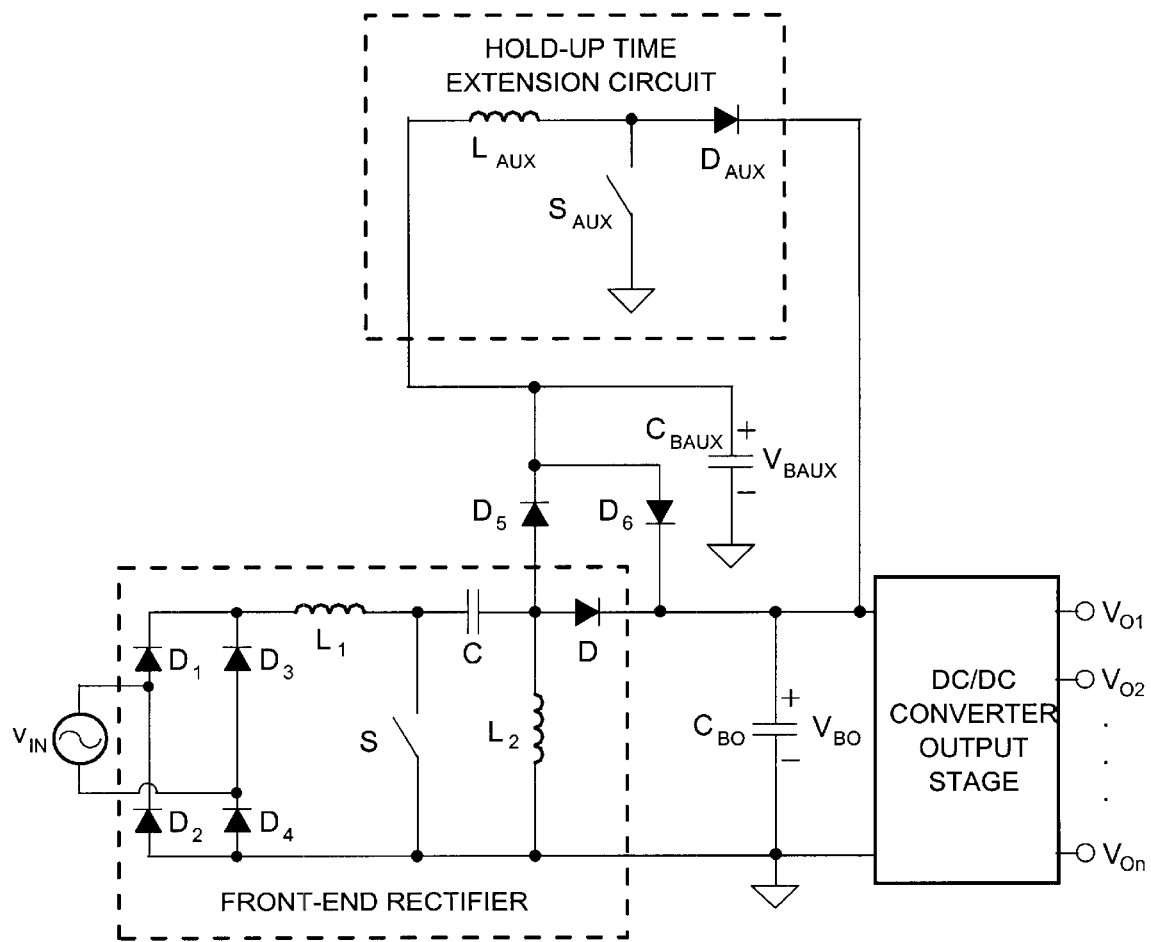
FIG. 9 shows the implementation of the boost hold-up-time extension circuit with a sepic front end.

FIGS. 7 and 8 shows the implementations of the hold-up-time extension circuit with the sepic and flyback converter, respectively.

Figure 6:
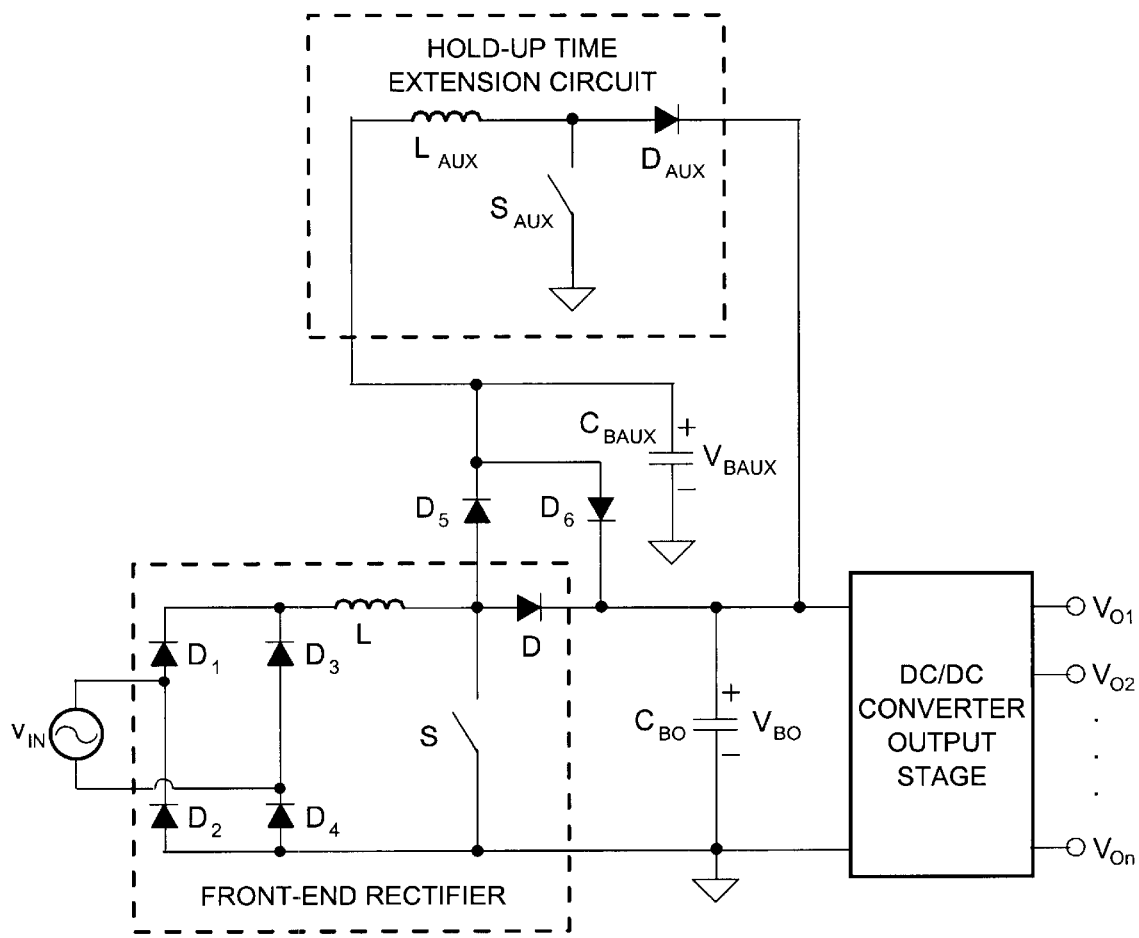
FIG. 6 shows the implementation of the hold-up-time extension circuit with the boost topology for a power supply with a boost front end.
Figure 10:
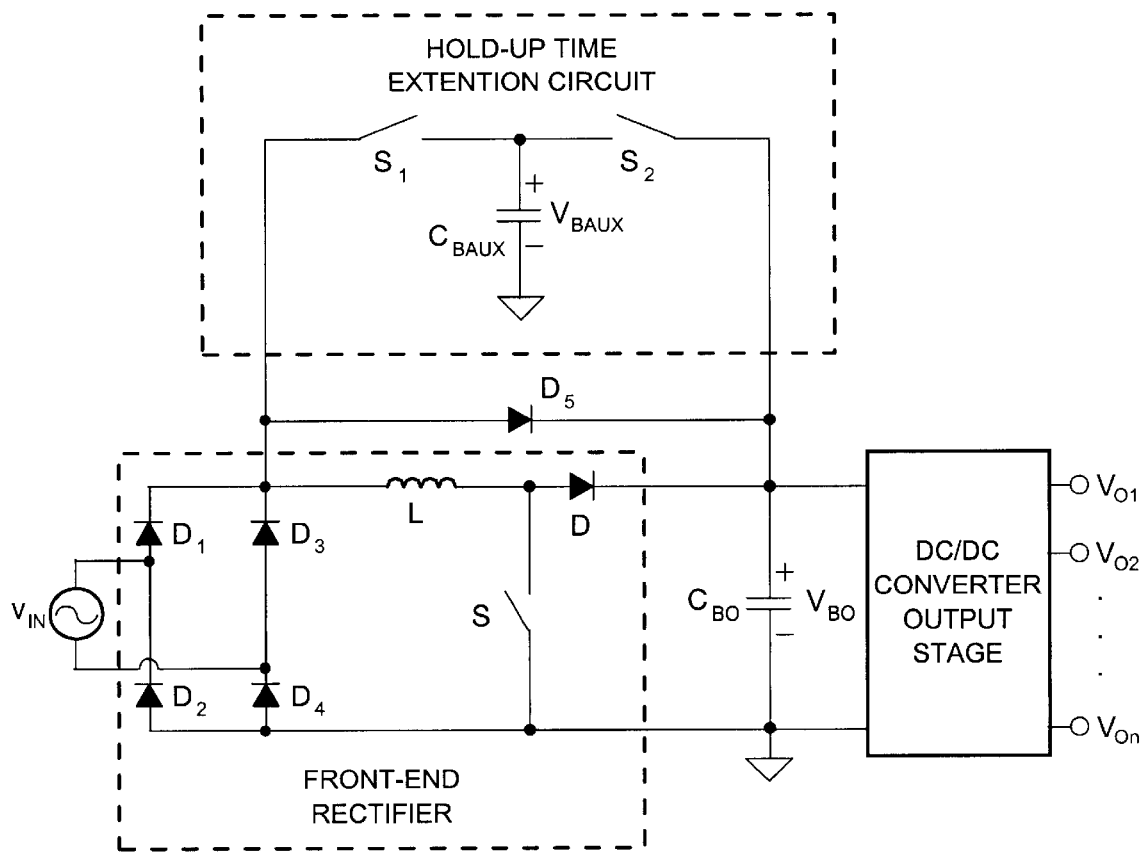
FIG. 10 shows the implementation of the hold-up-time extension circuit that utilizes the front-end boost converter as the hold-up-time extension circuit.
Figure 11:
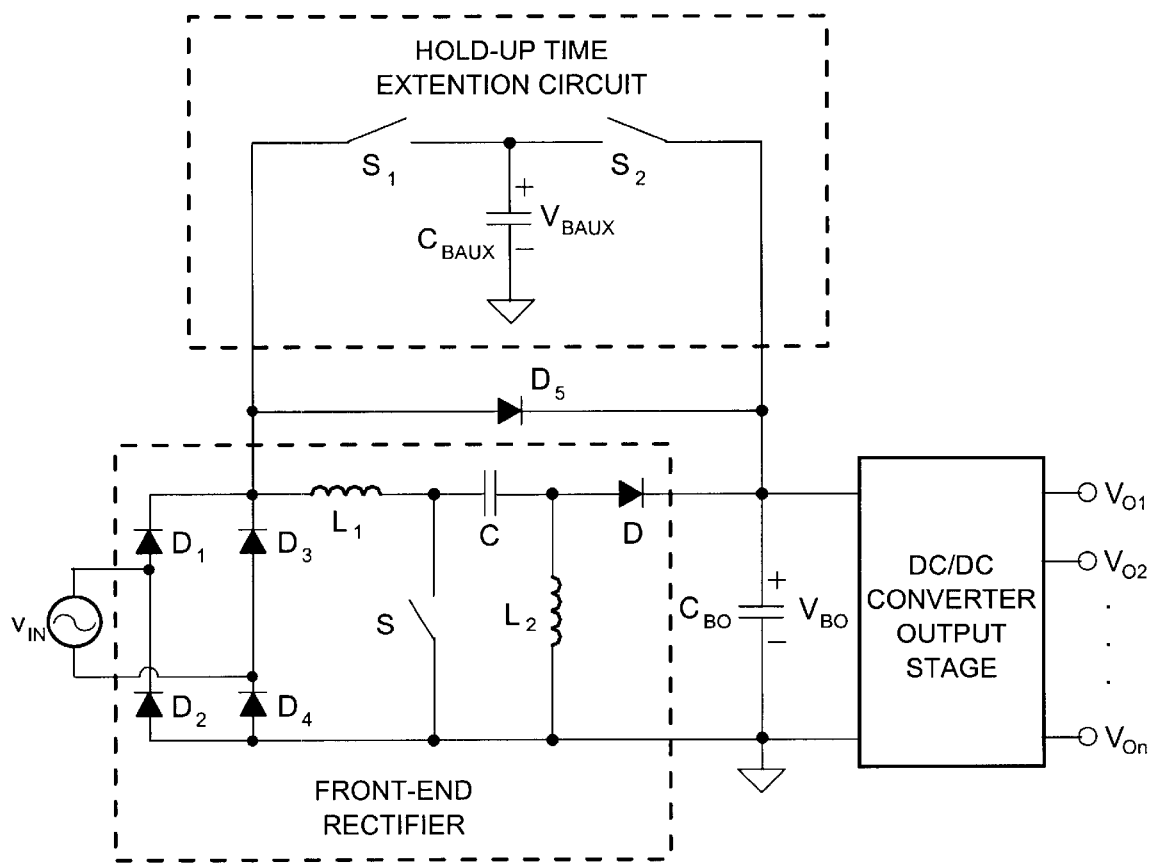
FIG. 11 shows the implementation of the hold-up-time extension circuit that utilizes the front-end sepic converter as the hold-up-time extension circuit.

The implementation of the boost hold-up-time extension circuit applied to the boost front end shown in FIG. 6 can be also implemented as in FIG. 10. In this implementation, the front-end boost converter is also used to provide hold-up-time extension by connecting $C_{BAUX}$ to the input of the boost converter after an input-voltage dropout is detected. The same concept can be applied to any front-end topology. FIG. 11 shows this implementation for the sepic topology. Generally, this implementation saves the component required for the power stage and control of the hold-up-time extension circuit, but requires more sophisticated detection and logic circuitry to properly control switches $S_1$ and $S_2$.

Figure 12:
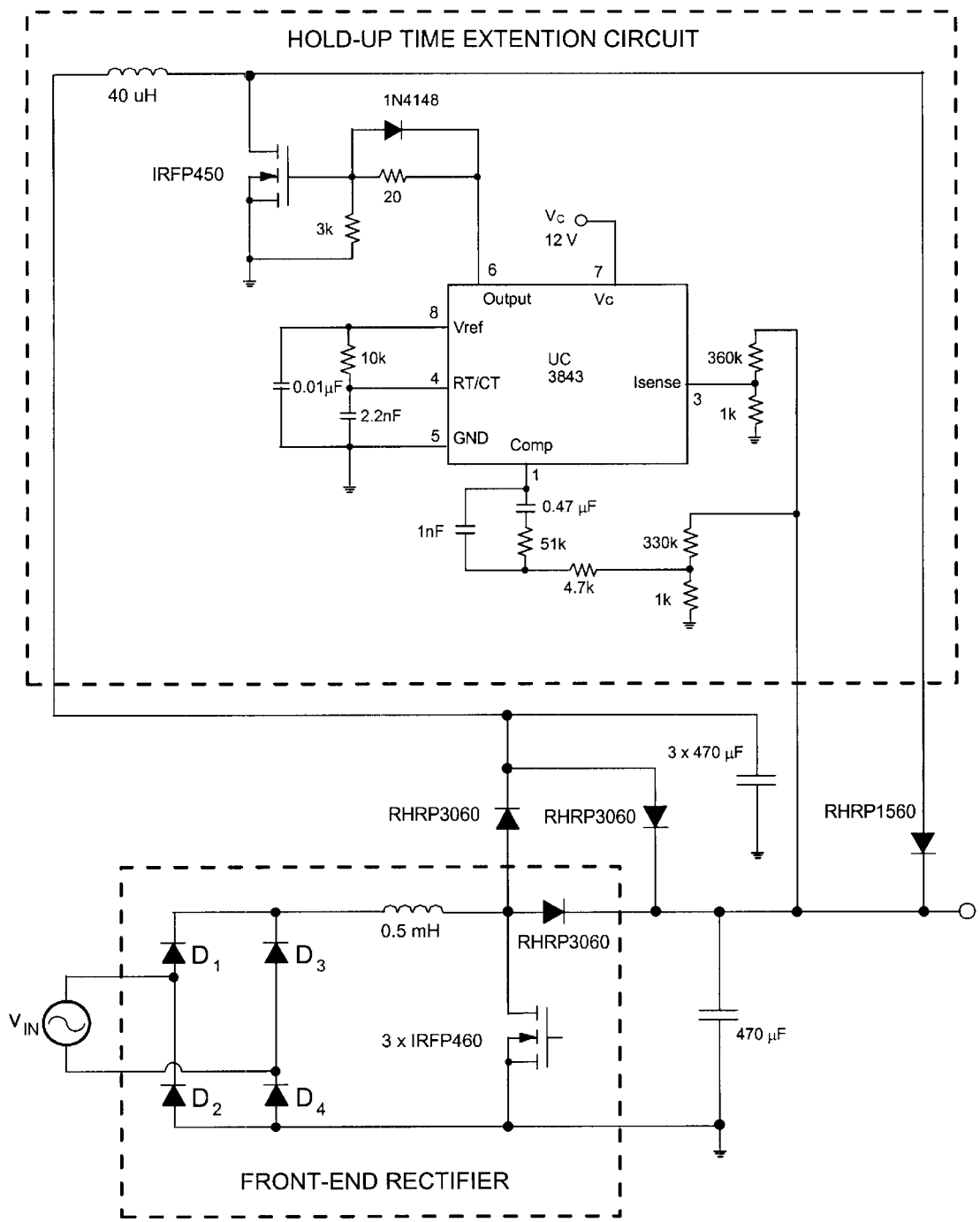
FIG. 12 shows a circuit diagram of the hold-up-time extension circuit in a 3-kW server power supply.

As an example, FIG. 12 shows a circuit diagram of the boost hold-up-time extension circuit implemented in a 3-kW ac/dc power supply with the boost front-end rectifier.

Finally, it should be noted that the method of this invention is not limited only to ac/dc converters, but can be also applied to dc/dc, dc/ac, and ac/ac power converters that require hold-up time capability.

What is claimed is:

1. A power converter comprising in combination:
   an input power source;
   a front end coupled to said input power source;
   two energy-storage capacitors coupled to the output of said front end;
   a converter output stage coupled to said energy-storage capacitors; said converter output stage providing a plurality of outputs;
   a hold-up-time extension circuit for utilization of the energy stored in said energy-storage capacitors during a hold-up time period;
   the input of said hold-up-time extension circuit connected to one of said energy-storage capacitors and the output of said hold-up-time extension circuit connected to the other said energy-storage capacitors through a rectifier; said hold-up-time extension circuit having a minimum input-voltage regulation point lower than the minimum input-voltage regulation point of said converter output; and an output voltage regulation point above said minimum regulation point of said converter output stage.

2. A power converter as in claim 1 where said input power source is an alternating current (ac) power source.

3. A power converter as in claim 1 where said input power source is a direct current (dc) power source.

4. A power converter as in claim 2 where said front end is a full-wave diode rectifier.

5. A power converter as in claim 2 where said front end is a boost rectifier.

6. A power converter as in claim 2 where said front end is a sepic rectifier.

7. A power converter as in claim 2 where said hold-up-time extension circuit is a boost converter.

8. A power converter as in claim 2 where said hold-up-time extension circuit is a sepic converter.

9. A power converter as in claim 2 where said hold-up-time extension circuit is a flyback converter.

10. A power converter as in claim 1 where said converter output stage produces said plurality of ac outputs.

11. A power converter as in claim 1 wherein each of said energy-storage capacitors consists of a plurality of capacitors connected in parallel.

12. A power converter providing a plurality of outputs comprising in combination:
   an input power source,
   a front end coupled to said input power source;
   two energy-storage capacitors connected to the output of said front end;
   a converter output stage connected to said energy-storage capacitors; said converter output stage providing a plurality of outputs
   a hold-up time extension circuit for utilization of the energy stored in said energy-storage capacitors during a hold-up time period
   a switching device to couple one of said energy-storage capacitors to the input of said front end during said hold-up time.

13. A power converter as in claim 12 where said input power source is an alternating current (ac) power source.

14. A power converter as in claim 12 where said input power source is a direct current (dc) power source.

15. A power converter as in claim 13 where said front end is a boost rectifier.

16. A power converter as in claim 13 where said front end is a sepic rectifier.

17. A power converter as in claim 12 wherein each of said energy-storage capacitors consisting of a plurality of capacitors connected in parallel.

* * * * *